No. 672,676. Patented Apr. 23, 1901.
C. W. KING.
MACHINE FOR ASSEMBLING INNER SOLES, UPPERS, LININGS, AND COUNTERS OF BOOTS OR SHOES.
(Application filed Mar. 28, 1896. Renewed Oct. 2, 1900.)
(No Model.) 4 Sheets—Sheet 1.
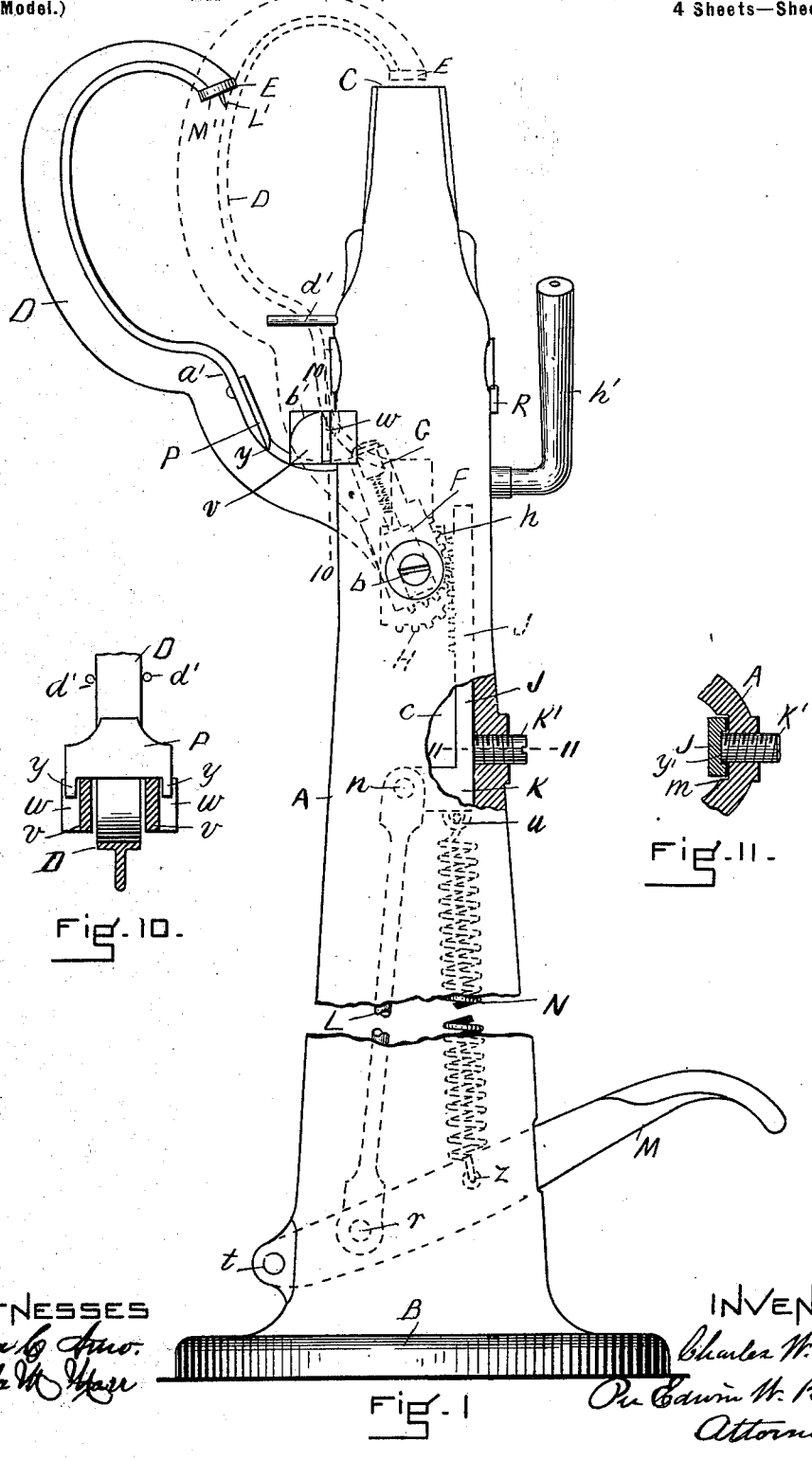
WITNESSES
INVENTOR
Charles W. King, No. 672,676. Patented Apr. 23, 1901.
C. W. KING.
MACHINE FOR ASSEMBLING INNER SOLES, UPPERS, LININGS, AND COUNTERS OF BOOTS OR SHOES.
(Application filed Mar. 29, 1895. Renewed Oct. 2, 1900.)
(No Model.)
4 Sheets—Sheet 2.
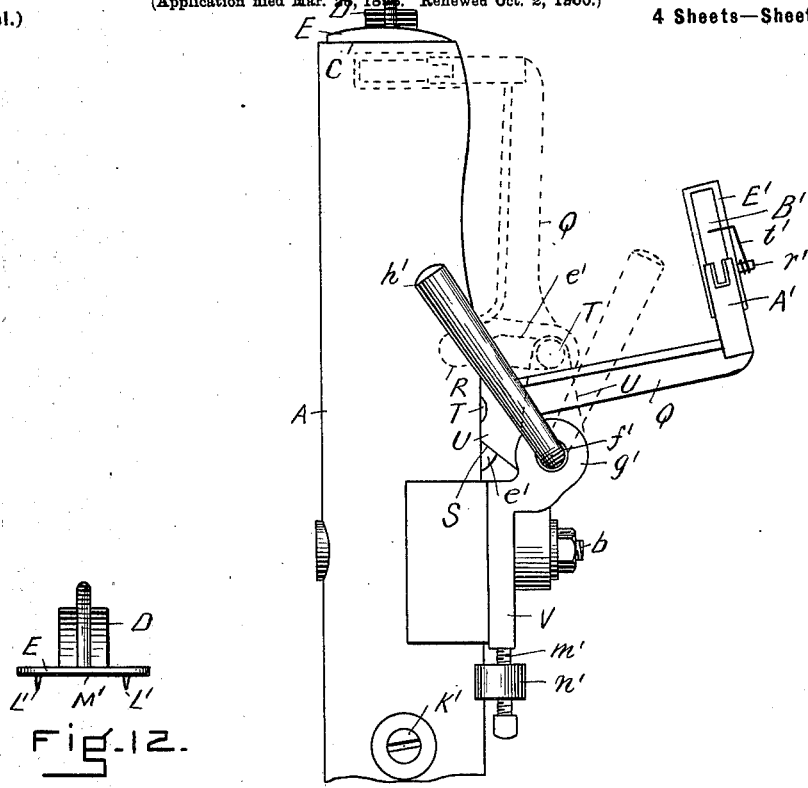
Fig. 12.
Fig. 2.
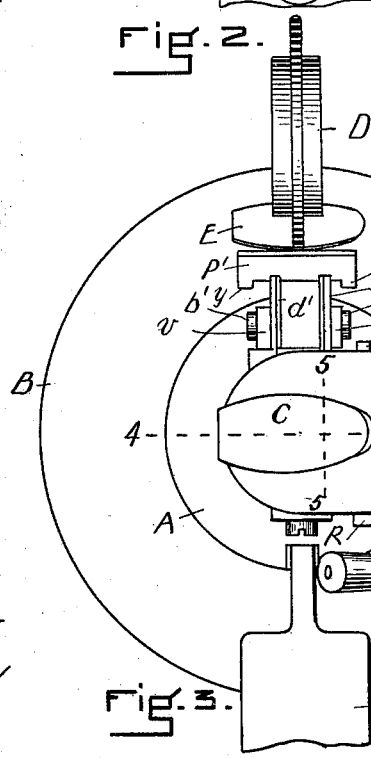
Fig. 3.
WITNESSES
INVENTOR
Charles W. King
Per Edwin W. Brown,
Attorney No. 672,676. Patented Apr. 23, 1901.
C. W. KING.
MACHINE FOR ASSEMBLING INNER SOLES, UPPERS, LININGS, AND COUNTERS OF BOOTS OR SHOES.
(Application filed Mar. 26, 1898. Renewed Oct. 2, 1900.)

(No Model.) 4 Sheets—Sheet 3.

WITNESSES
INVENTOR
Charles W. King
Per Edwin W. Brown,
Attorney

No. 672,676. Patented Apr. 23, 1901.
C. W. KING.
MACHINE FOR ASSEMBLING INNER SOLES, UPPERS, LININGS, AND COUNTERS OF BOOTS OR SHOES.
(Application filed Mar. 28, 1896. Renewed Oct. 2, 1900.)

(No Model.) 4 Sheets—Sheet 4.

WITNESSES

INVENTOR
Charles W. King,
Per Edwin W. Brown,
Attorney.

UNITED STATES PATENT OFFICE.

CHARLES W. KING, OF NEWTON, MASSACHUSETTS, ASSIGNOR TO THE PURITAN LASTING MACHINE COMPANY, OF PORTLAND, MAINE.

MACHINE FOR ASSEMBLING INNER SOLES, UPPERS, LININGS, AND COUNTERS OF BOOTS OR SHOES.

SPECIFICATION forming part of Letters Patent No. 672,676, dated April 23, 1901.

Application filed March 28, 1896. Renewed October 2, 1900. Serial No. 31,761. (No model.)

*To all whom it may concern:*

Be it known that I, CHARLES W. KING, of Newton, in the county of Middlesex and State of Massachusetts, have invented certain new and useful Improvements in Machines for Assembling Inner Soles, Uppers, Linings, and Counters of Boots or Shoes, of which the following is a full, clear, and exact description.

This invention has for its object the assembling or placing together in proper position of an inner sole, lining, and counter in connection with the upper of a boot or shoe for the lasting of the upper; and the invention consists of the construction and arrangement of parts for the assembling of an inner sole, lining, and counter in connection with the upper of a boot or shoe for the lasting of the upper of the boot or shoe, all substantially as hereinafter fully described, reference being had to the accompanying sheets of drawings, in which is illustrated a machine constructed in accordance with this invention, in which—

Figure 4:
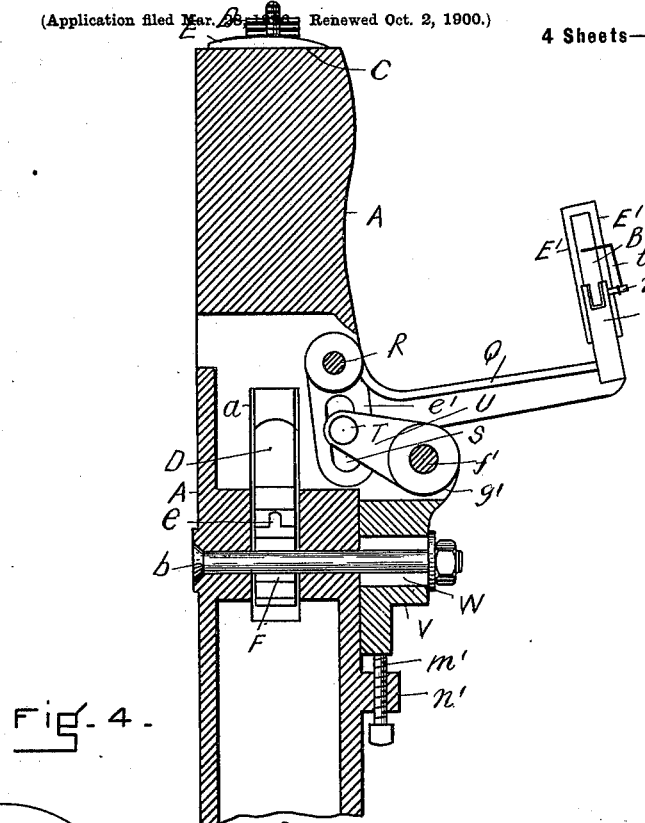
Figure 5:
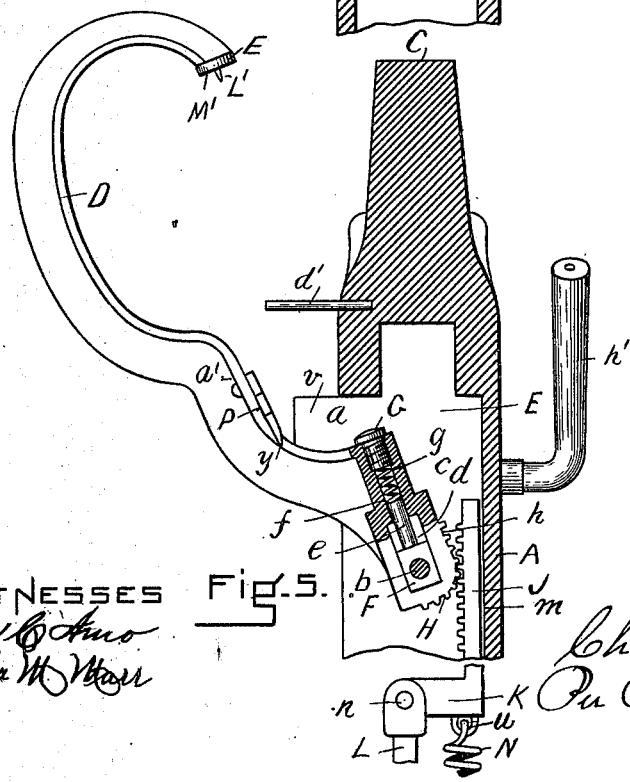

Figure 1 is a front elevation. Fig. 2 is a side elevation of the upper part of the machine. Fig. 3 is a plan view. Fig. 4 is a vertical cross-section on line 4 4, Fig. 3. Fig. 5 is a vertical cross-section on line 5 5, Fig. 3. Figs. 6, 7, 8, and 9 are plan views showing the several steps taken in using the machine in assembing the parts previous to lasting the upper of a boot or shoe. Fig. 10 is a detail vertical section on line 10 10, Fig. 1. Fig. 11 is a detail cross-section on line 11 11, Fig. 1. Fig. 12 is an end elevation of the end of the arm.

In the drawings, A represents a standard or column having a base B, on which are supported and carried the various operating parts of the machine. The upper end C of the standard is flat, its edges being shaped to conform generally to the shape or edge of the heel portion of an inner sole, as shown in plan view in Fig. 3, and the standard for a short distance below the plate is on the outside shaped correspondingly.

D is an arm at the side of the standard extending through an opening $a$ in the side into a chamber $c$ of the standard and pivoted to a cross pin or screw $b$ and at its upper portion being curved, as shown in Figs. 1 and 5, and having on its end a cross-plate E of substantially the same outline as the upper end C of the standard, but somewhat smaller. This arm D is secured to its pivot by a block F, through which the pin $b$ extends, this block fitting freely in a side opening $d$ in the arm and adapted to slide back and forth therein and having a pin $e$, which projects up into a socket $f$ in the arm, in which it can freely move back and forth, a spring $g$ in said socket bearing against the upper end of said pin and against the inner end of a screw G, which screws into the arm above said pin, as shown more particularly in Fig. 5. The inner end of the arm D has on its edge a segment-gear H, concentric to the pin $b$, which on its upper portion extends in a straight or vertical line, as at $h$, Fig. 5, which gear is arranged to engage with a vertical rack-bar J, adapted to slide up and down in a guideway $m$ in the inside of the column and having a right-angular projecting portion K at its lower end, to which portion piece is pivoted at $n$ a pitman-rod L, connected at its lower end by a pivot $r$ to a treadle M, pivoted at $t$ to the standard and extending forward to and outside of the column for operation thereof by the foot.

N is a spiral spring in the chamber of the column connected by one end to the treadle at $z$ and by its other end at $u$ to the lower end of the rack-bar J, as shown in dotted lines in Fig. 1 more particularly.

Pressing down the treadle M pulls down the rack-bar J, which by its engagement with the segment-gear on the arm D swings the arm forward and toward the standard into a vertical position for its plate E then to be vertically over and little above the upper end C of the column, and at such time the rack-bar engages with the gear-teeth on the straight portion $h$ above the segment portion, so that in the continued movement of the treadle and the rack-bar the arm D is pulled down with it until its plate E is close to or bears upon the column-plate, as desired, for the purpose of this invention. The downward movement of the arm is against the spring g, the arm sliding or moving over its pivot-block F. The treadle being allowed to rise, the rack-bar moves up, carrying with it the arm D, assisted by its springs g and N, and as the rack-bar engages with the segmental gear in its continued upward movement it swings the arm D outward into its normal position, as shown in Figs. 1, 3, and 5.

On the side of the column next to the arm D are two horizontal lugs v, between which the arm moves when it is swung up, and in each of these lugs on its outer side is a vertical groove or slot w at right angles to the movement of the arm, into which move the respective ends or edges y of a plate P, secured by screws a' to the inner side of the arm. When the arm moves down after being swung forward, its plate P enters the grooves and serves the purpose of steadying the arm in its downward movement and insuring that its plate E is in the proper position over the end C of the column. Each lug v is cut away at b' on its outer side to allow in the swing of the arm forward room for the plate ends y to pass up into position over the slots or grooves. Above these lugs v are two horizontal projecting pins d', which are secured to the standard and are of a distance apart equal to the width of the plate-arm D, between which the arm passes when swung up into position, which pins also serve as guides or steadying-pins to the arm in its downward movement.

Figure 8:
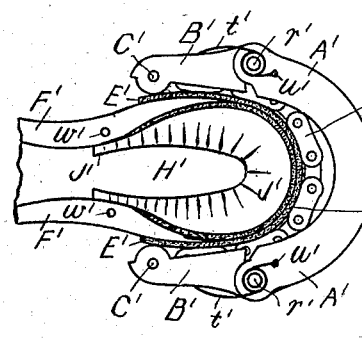
Figure 9:
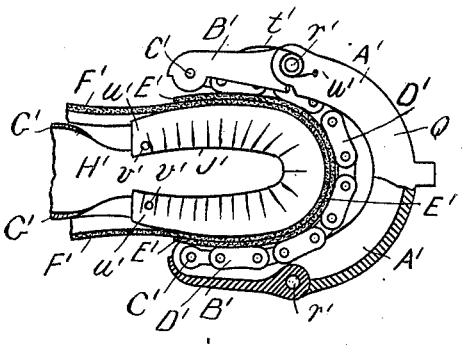

Q is an arm on the side of the column at right angles to the plate-arm D, pivoted in the side of the standard to a cross pin or screw R, and in an angular extension e' of this arm is a slot S, in which is disposed a cross-pin T of two arms U, pivoted at f' between two lugs g' on the outside of the column and having a handle h' for operation thereof. The lugs g' are of a block V, secured to the standard by the pivot-screw b of the arm D, passing through a vertical slot W in the block, the block resting on a vertical screw m', screwing up through a lug n' of the standard, by which the height of the lugs can be adjusted to regulate the height of the arm Q for its work. Attached to the upper end of this arm Q are two arms A', projecting forward, having their inner edges curved, as shown in Figs. 3, 8, and 9, and pivoted at r' to each end of each of these arms A' are extensions or pieces B', which project still farther forward and are adapted to freely swing to and from each other on their respective pivots. To press them forward toward each other, each arm B' has a spring t', which bears against its outer side and is coiled around its pivot r', its other end bearing or connected to a pin u' on the arms A'. Connected to each outer end of each of these arms by a pivot C' is a chain or flexible band D', which extends back and is freely disposed in between the arms B' and A', as shown in plan view in Figs. 8 and 9 more particularly. Attached to each end of the chain is a strip E' of leather, which extends along the inner side of the chain, as shown.

Swinging forward by the handle h' by its slot S, connected with the arm Q, the arm is swung up until its curved arms A' are in a horizontal position, and in such position they embrace the standard just below the upper end C, as shown in dotted lines in Fig. 2 and Figs. 8 and 9, and when in such position the arm is locked by the cross-pin T of the handle being at the outer end of the slot S, and the parts then being substantially at right angles to their pivots it causes a lock of the several parts, which prevents their movements in themselves; but by operating the handle all parts are moved back to their normal positions again.

Figure 6:
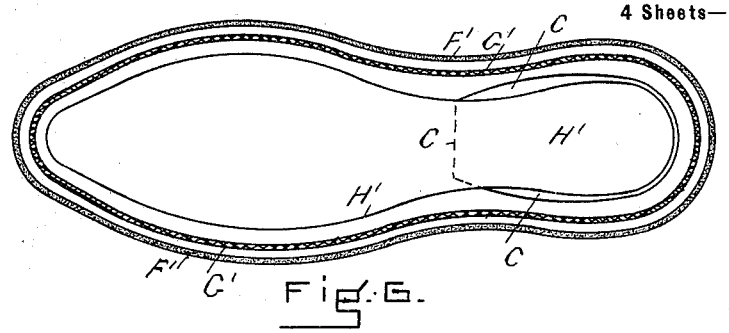
Figure 7:
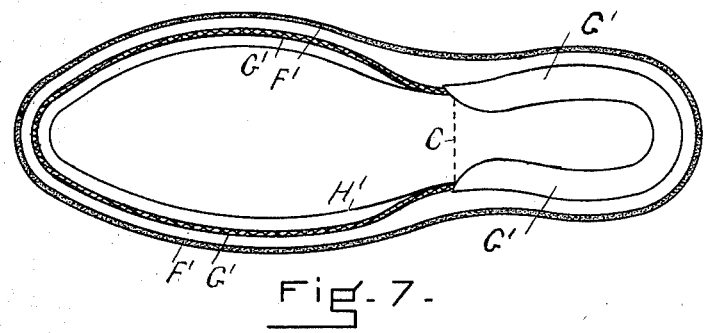

The operation of the machine is substantially as follows and is illustrated fully in Figs. 6, 7, 8, and 9: With the machine in its normal position, as shown in Figs. 1, 2, 3, 4, and 5, place the upper F', with its lining G', inside over the upper end of the column and let it rest. Then place the inner sole H' by its heel portion on the top C, which supports the same, as shown in Fig. 6, and press down the treadle M, which pulls down the rack-bar J, swinging the arm D forward until its plate E is over the end C and inner sole, and in the continued movement of the treadle the arm and its plate are pulled down for its plate to press firmly down upon the heel of the sole upon the end C. The lining G' at its edges at the heel is then pulled by hand over the edges of the inner sole and held by hand upon the inner sole, as shown in Fig. 7. The heel-counter J' is then placed over the inner sole and the lining thereon, with its side edges inserted between the lining and upper and the bottom pressed down close to and on the lining. Then move the handle h' back, which swings up the arm Q and presses closely the flexible band D' around about and against the sides and back of the upper at the heel, which holds the upper, lining, and counter firmly between the flexible band and standard. With the upper, lining, and counter held, as described, by the flexible band, holding the corners u' of the counter J' by the left hand close down upon the inner sole and its sides against the column, a tack V' is driven through each corner of the counter into the lining and inner sole, as shown in Fig. 9, which secures them together at such points. The upper and parts connected thereto can then be removed from the machine, being ready for lasting.

The plate E has two projecting pins L' from its under side M', which press into the inner sole when the plate is thereon and insure that the inner sole will not turn, twist, or move at such time; also, the under side or surface of the plate can be roughened. The arm D is curved or bent outward, as shown, to allow room for the operator in handling the upper of the boot and other parts.

If desired, before the upper is removed from the machine and before securing the counter by the tacks, the upper can be brought by the fingers over the counter at its corners and tacks $w'$ driven through it, the counter, lining, and inner sole at the corners of the counters, as before, as shown in Fig. 8, which might be desired for some lasting-machine, although generally it is sufficient to secure the counter to the inner sole without the upper.

In front of the standard is a screw $K'$, which screws through its wall and extends into a longitudinal groove $y'$ in the back of the rack-bar to bear against the rack-bar, by which it can be adjusted as to its close engagement with the arm-gear, as desired.

If desired, when the inner sole, counter, upper, and lining are held by the flexible band, they can be secured by tacks all around the heel, practically lasting the same at the heel.

Having thus described my invention, what I claim is—

In combination, a standard having a head or support on its upper end, an arm pivoted to said standard having a plate on its upper end, pins or projections from the under side of said plate and means for operating said arm to move it for its plate to be above and over said standard and to be then moved down for said plate to press or bear upon said standard head or article placed thereon.

In testimony whereof I have hereunto set my hand in the presence of two subscribing witnesses.

CHARLES W. KING.

Witnesses:
EDWIN W. BROWN,
EMMA H. KING.